US006275855B1

(12) United States Patent
Johnson

(10) Patent No.: US 6,275,855 B1
(45) Date of Patent: Aug. 14, 2001

(54) SYSTEM, METHOD AND ARTICLE OF MANUFACTURE TO ENHANCE COMPUTERIZED ALERT SYSTEM INFORMATION AWARENESS AND FACILITATE REAL-TIME INTERVENTION SERVICES

(76) Inventor: R. Brent Johnson, 111 W. 5th St., Suite 300, Tulsa, OK (US) 74103

( * ) Notice: Subject to any disclaimer, the term of this patent is extended or adjusted under 35 U.S.C. 154(b) by 0 days.

(21) Appl. No.: 09/293,605

(22) Filed: Apr. 16, 1999

Related U.S. Application Data

(63) Continuation-in-part of application No. 09/235,425, filed on Jan. 28, 1999, which is a continuation-in-part of application No. 08/942,993, filed on Oct. 2, 1997, now abandoned.

(51) Int. Cl.[7] .................................................. G06F 15/173
(52) U.S. Cl. ........................... 709/224; 709/223; 709/217
(58) Field of Search ................................... 709/223, 224, 709/217, 203; 714/31, 38; 379/216; 703/26, 27

(56) References Cited

U.S. PATENT DOCUMENTS

| 4,182,933 | | 1/1980 | Rosenblum ............................ 179/1.5 |
|---|---|---|---|
| 4,310,720 | | 1/1982 | Check, Jr. ........................... 178/22.08 |
| 4,430,728 | | 2/1984 | Beitel et al. ........................... 364/900 |
| 4,531,023 | | 7/1985 | Levine ..................................... 179/2 |
| 4,578,531 | | 3/1986 | Everhart et al. ..................... 178/22.08 |
| 4,763,351 | | 8/1988 | Lipscher et al. ........................ 379/95 |
| 4,965,772 | * | 10/1990 | Daniel et al. .......................... 709/224 |
| 4,965,804 | | 10/1990 | Trbovich et al. ....................... 380/21 |
| 5,119,377 | * | 6/1992 | Cobb et al. ............................. 714/38 |
| 5,179,695 | * | 1/1993 | Derr et al. .............................. 714/31 |
| 5,204,961 | | 4/1993 | Barlow ................................. 395/725 |
| 5,237,677 | | 8/1993 | Hirosawa et al. .................... 395/575 |
| 5,283,861 | * | 2/1994 | Dangler et al. ....................... 345/339 |
| 5,347,578 | | 9/1994 | Duxbury ................................. 380/4 |
| 5,381,470 | * | 1/1995 | Cambray et al. ..................... 379/216 |
| 5,416,842 | | 5/1995 | Aziz ...................................... 380/30 |
| 5,426,421 | * | 6/1995 | Gray ..................................... 709/223 |
| 5,432,932 | * | 7/1995 | Chen et al. ........................... 709/103 |
| 5,452,460 | | 9/1995 | Distelberg et al. ................... 395/700 |
| 5,537,554 | | 7/1996 | Motoyama ........................... 395/280 |
| 5,550,984 | | 8/1996 | Gelb .................................... 395/200 |
| 5,592,657 | | 1/1997 | Johnson et al. ...................... 395/500 |
| 5,678,002 | | 10/1997 | Fawcett et al. ...................... 395/183 |
| 5,689,637 | | 11/1997 | Johnson et al. ..................... 395/183 |
| 5,742,762 | * | 4/1998 | Scholl et al. ......................... 709/224 |
| 5,796,633 | * | 8/1998 | Burgess et al. ...................... 709/224 |
| 5,812,826 | * | 9/1998 | McLain, Jr. ............................ 703/27 |
| 5,812,864 | * | 9/1998 | McCoy et al. ......................... 703/26 |
| 6,023,507 | * | 2/2000 | Wookey ................................ 709/224 |

FOREIGN PATENT DOCUMENTS

0474058A2    11/1992    (EP) ............................ G06F/11/00

* cited by examiner

*Primary Examiner*—Ayaz Sheikh
*Assistant Examiner*—Philip B. Tran
(74) *Attorney, Agent, or Firm*—Head, Johnson & Kachigian

(57) ABSTRACT

An improved system, method and article of manufacture for facilitating computerized alert system information awareness, information presentation consistency and real-time intervention services is hereby disclosed. A transmitting, or monitored system central processing unit communicates alert related information to a second central processing unit. The second, or monitoring system central processing unit validates such alert information, apprises the operator of status modification with respect to all objects monitored, provides for historical, or precipitating event analysis, and facilitates the input of remedial entries by connecting to the monitored system as an operator console with input command authority. The invention additionally provides for the clearing of monitored object status indicators and a return to its intended monitoring function.

10 Claims, 8 Drawing Sheets

FIG. 7

History View 'COAX2 Simulated MCS' at RBJ_LAPTOP [127.0.0.1]

GOTO LIVE ▼▼▼▼ ▲▲▲▲ LIVE SYNC

```
 - 09.22.53 -&SYZ= HSMZ      ARC0523I SPACE MANAGEMENT ENDED ON VOLUME HSM074,
 - 0
 - 09.22.54 -&SYZ= HSMZ      ARC0523I (CONT.) DATA SET(S) MIGRATED/DELETED, 0
 - 09.22.56 -&SYZ= HSMZ      ARC0523I (CONT.) TRACKS(S) FREED, MINAGE 0, TIME
*09.22.57 -&SVV= VTAM                IST931I SYMPTOM STRING = PIDS/6620145 LVLS/341
  RIDS/ISTSSCTM
*09.22.57 -&SVV= VTAM                IST931I SYMPTOM STRING = PCSS/91#295
*09.22.57     PCSS/SSTMPR01 OPCS/AM#GBIND
*09.22.57 -&SVV= VTAM                IST931I SYMPTOM STRING = PRCS/10020000
  PRCS/00000004
*09.22.57 -&SVV= VTAM                IST314I END
*09.22.59 -&SVV= VTAM                IST931I SYMPTOM STRING = PIDS/568508501 LVLS/341
  RIDS/ISTSSCTM
*09.22.59 -&SVV= VTAM                IST931I SYMPTOM STRING = PCSS/91#295
*09.22.59     PCSS/SSTMPR01 OPCS/AM#GBIND
*09.22.59 -&SVV= VTAM                IST931I SYMPTOM STRING = PRCS/10020000
  PRCS/00000004
*09.22.59 -&SVV= VTAM                IST314I END
 - 09.22.59 -&SYZ= HSMZ      ARC0523I (CONT.) 05 30 05
 - 09.23.03 -&SYZ= HSMZ      ARC0522I SPACE MANAGEMENT STARTING ON VOLUME
 00- IEE612I CN=MVS2AOS3 DEVNUM=0B83 SYS=MVS2      CMSYS=MVS2
 IEE163I MODE= R
 SA  LT-1                    History: Tue Mar 02 09:23:03 1999      -=70
```

SYSTEM, METHOD AND ARTICLE OF MANUFACTURE TO ENHANCE COMPUTERIZED ALERT SYSTEM INFORMATION AWARENESS AND FACILITATE REAL-TIME INTERVENTION SERVICES

REFERENCE TO PENDING APPLICATIONS

This application is a continuation-in-part of U.S. patent application Ser. No. 09/239,425, filed Jan. 28, 1999, and entitled "A Secure Electronic Mail System"; and a continuation-in-part of U.S. application Ser. No. 08/942,993 filed Oct. 2, 1997 now abandoned and entitled "Emulation and Emulated Screen History".

REFERENCE TO MICROFICHE APPENDIX

This application is not referenced in any microfiche appendix.

TECHNICAL FIELD OF THE INVENTION

The present invention is directed to an improved system, method and article of manufacture for identifying, analyzing and responding to computerized alert system messages. More particularly, the present invention is directed to an improved system, method and article of manufacture to allow for the identification and determination of alert event precipitation factors, remedial course(s) of action and the immediate assumption of console level authority of those systems generating such messages to facilitate real-time problem resolution.

BACKGROUND OF THE INVENTION

Computerized alert systems are well known throughout the information technology sector and are used to monitor a multiplicity of diverse hardware and software platform components. Examples of such component monitoring include, environmental controls, home alarm systems, mainframe computer access authorization(s), database access restrictions, application program functionality and critical operating system modules.

Typically, alert systems are operating system, or platform, specific and vary with respect to information presentation format. Consequently, an operator responsible for monitoring diverse alert applications would have to be familiar with the alert message formatting presentations of each system. This is a challenge addressed and greatly simplified by the instant invention.

Lack of message presentation consistency pales, however, when compared to a far more pronounced deficiency inherent in today's computerized alert system applications. That is, applications represented by the present art, at best, simply notify the operator that a "monitored event" has occurred. Consequently, today's art proves woefully inadequate in providing adequate information to determine "why" an event has occurred, and even more importantly, lacks provision to immediately execute input entries to remedy a monitored and reported event. These are two deficiencies noted and addressed by the instant invention.

Stated succinctly, a computerized alert system should advise a system operator when a monitored event has occurred, provide a vehicle to analyze information relevant to the occurrence of that event, and lastly, allow the operator to initiate remedial actions to minimize likelihood of adverse impact attendant to the monitored event. Today's systems only address the first of these three requirements. The present invention, in a comprehensive manner, addresses all three.

BRIEF SUMMARY OF THE INVENTION

The present invention provides an improved system, method and article of manufacture for facilitating computerized alert system information awareness, information presentation consistency and real-time, remedial intervention services.

A transmitting, or monitored system central processing unit (the term "central processing unit" hereafter alternatively referred to as "CPU") communicates alert related information to a second CPU. The second, or monitoring system CPU, validates such alert information, apprises the operator of status modification with respect to monitored objects, provides for historical, or precipitating event analysis and facilitates the input of remedial entries by connecting to the monitored system as an operator console with input command authority.

An object of the present invention is to provide standardized or uniform presentation of information relating to change(s) in the status of a monitored object, irrespective of the alert system or computer platform from which the status change is reported. The invention satisfies this objective by displaying an icon representing the monitored object on a video display, otherwise referred to as a computer monitor. A change in object status warranting a system operator's attention is accommodated via a change in icon color. As an example, the color green would reflect the normal or routine operating state of a monitored object. Changing the icon's color to red would indicate that immediate attention is required.

Another objective of the instant invention is to provide sufficient information to identify the cause of the monitored object event, or a corrective action to be employed whenever such an event occurs. As will be disclosed in detail, this objective is met by the invention's emulation of a transmitting or monitored system console. Such emulation provides an option for the operator to query externally maintained history logs, scroll monitored system console screens or execute previously supplied or self determined, scripted, manual or otherwise directed corrective action(s).

Though limited function console management, emulation and historical data analysis techniques are known to those skilled in the art, the instant invention relies upon and employs advanced technology to address and satisfy its console management emulation and data analysis requirements. For example, such advanced technology is represented and disclosed in U.S. Pat. No. 5,689,637, entitled "Console Simulator, Multi-Console Management System and Console Management Distribution System", issued to Applicant, Nov. 18, 1997, and Applicant's application Ser. No. 08/942,993, filed Oct. 2, 1997 and entitled "Emulation and Emulated Screen History". Both U.S. Pat. No. 5,689,637 and Applicant's application No. 08/942,993 are hereby cited and incorporated within the instant application by reference for purposes of providing a full, detailed and enabling disclosure.

It is yet another objective of the instant invention to allow a system operator to directly input system entries into the monitored system CPU and to remedy those events precipitating the object alert. This objective is also addressed and satisfied by allowing the Improved Alert Monitoring System (the term "Improved Alert Monitoring System" hereafter alternatively referred to as "IAMS") to assume console command authority of the monitored system and emulate a transmitting or monitored system console.

Consequently, given the deficiencies of the present art, what is needed is a system, method and article of manufacture to advise a system operator when a monitored alert object event has occurred, provide a vehicle to analyze information relevant to the occurrence of that event, and lastly, allow for the immediate execution of remedial actions to minimize adverse consequence potential associated with the event. Today's systems, at best, address only the first of these three requirements. The present invention, in a comprehensive and integrated manner, addresses and resolves all three requirements.

BRIEF DESCRIPTION OF THE DRAWINGS

FIGS. 4 through 8 provide illustrative samples of graphic user interfaces employed with respect to the invention's preferred embodiment.

DETAILED DESCRIPTION OF THE INVENTION

While the making and using of various embodiments of the present invention are discussed in detail below, it should be appreciated that the present invention provides for inventive concepts capable of being embodied in a wide variety of specific contexts. The specific embodiments discussed herein are merely illustrative of specific manners in which to make and use the invention and are not to be interpreted as limiting the scope of the instant invention.

The claims and the specification describe the invention and the terms that are employed in the claims draw their meaning from the use of such terms in the specification. The same terms applied in the prior art may be broader in meaning than specifically employed herein. Whenever there is a question between the broader definition of such terms used in the prior art and the more specific use of the terms herein, the more specific meaning should be assumed.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled. The general features including hardware and software components of the Improved Alert Monitoring System are described and disclosed in association with accompanying FIGS. 1 through 8.

Figure 1:
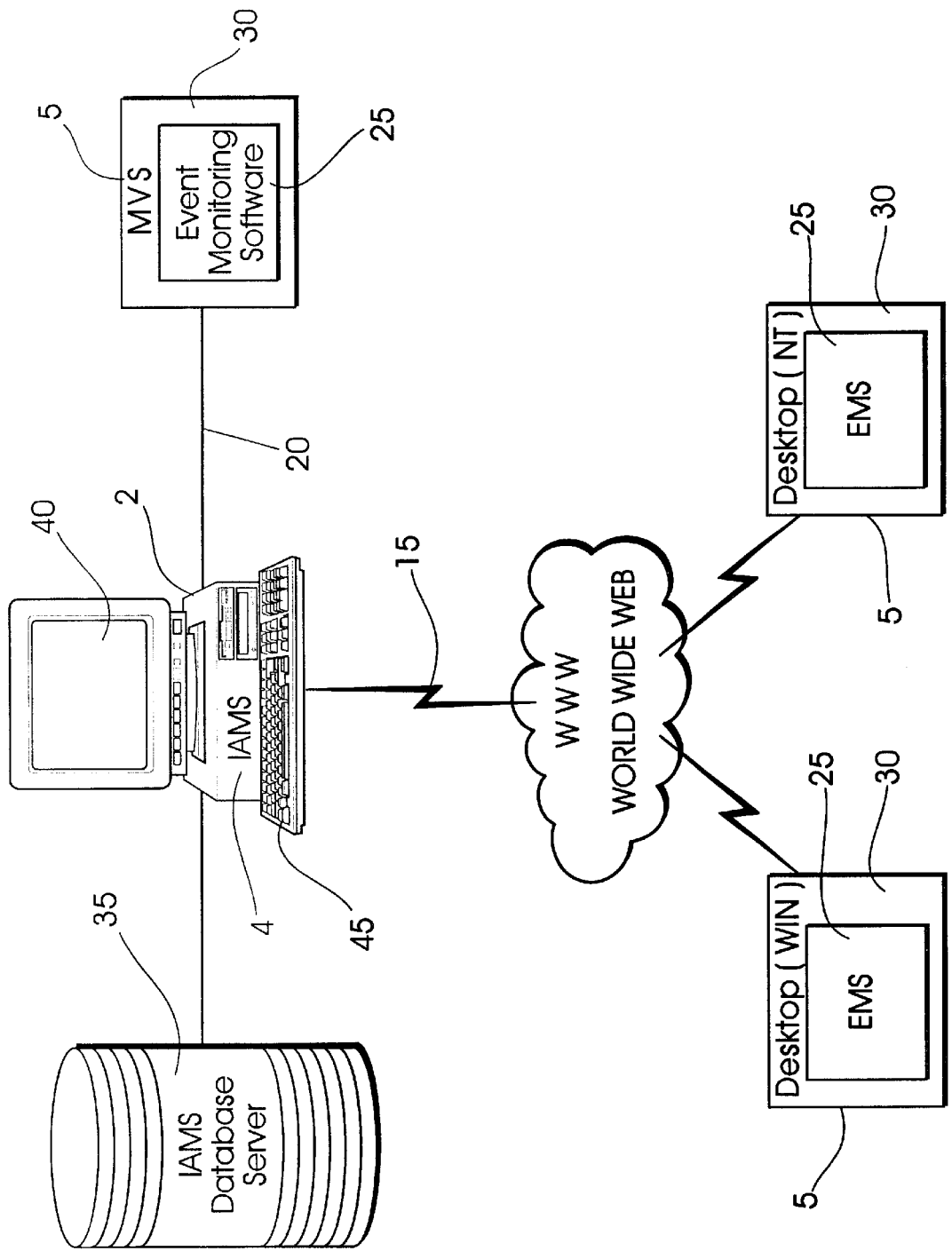
FIG. 1 is an illustration depicting hardware and software components comprising an improved alert monitoring system in accordance with the present invention.

Turning now to FIG. 1, a transmitting or monitored system central processing unit 5 communicates alert related information to a second central processing unit 2 executing an Improved Alert Monitoring System program 4. The transmitting or monitored system CPU 5 operates under the control of an operating system 30 which in turn, facilitates the execution input/output requests made by third party event monitoring software 25. The invention's interaction with a transmitting, or monitored system CPU 5 is not limited by a particular CPU manufacturer or type, the number of CPU's to be monitored, or operating system 30 constraints. Diverse alert event monitoring software 25, also well known to those reasonably skilled in the art, is supported by the instant invention and may include any number of third party product offerings. Examples of such third party alert event monitoring programs include, such as but not limited to, Omegamon, Tivoli or TNG.

Means of communication between a monitored system CPU 5 and a monitoring system CPU 2 are also well known to those reasonably skilled in the art. Such communication can be facilitated by way of a hard link, such as a coax cable 20, the World Wide Web or any other network configuration supporting inter-computer communication 15. It is to be understood that a secure connection can be established in various ways. One example is set forth in Applicant's co-pending application titled "A Secure Electronic Mail System", Ser. No. 09/239,425, filed Jan. 28, 1999. Input/Output requirements attendant to the Improved Alert Monitoring System are facilitated by way of an input device, such as a computer keyboard 45, and video display capability, such as a computer monitored 40. The Improved Alert Monitoring System 4 is also communicably attached to a database server 35 and utilizes this database server to retrieve control string connect parameter information in addition to other supplemental information as will be disclosed when discussing external database and event processing components of the instant invention as illustrated in FIG. 2.

Figure 2:
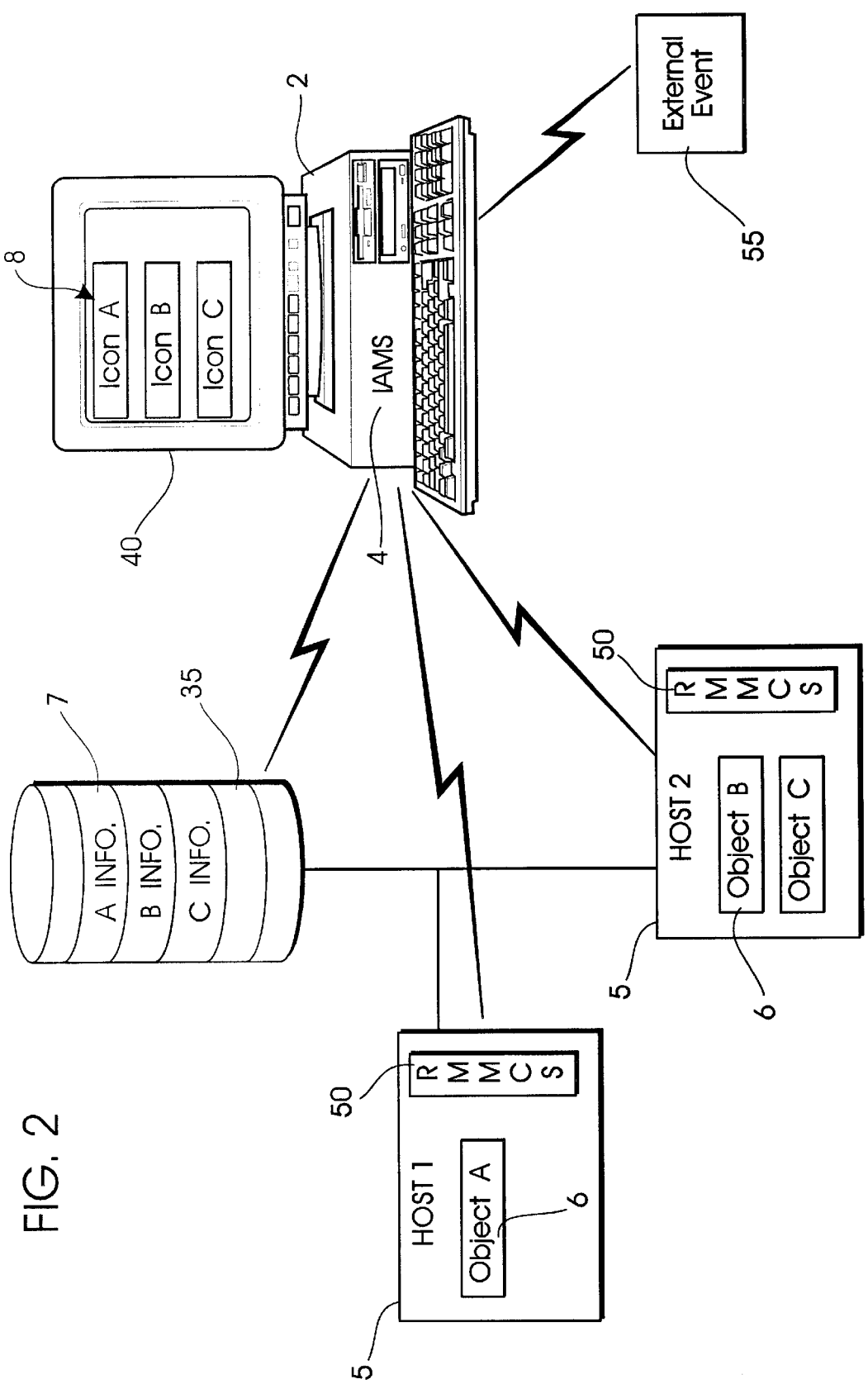
FIG. 2 is an illustration of the Improved Alert Monitoring System providing additional detail with respect to external database and event processing components.

Turning now to FIG. 2, communication between the monitoring system CPU 2 and the monitored system CPU 5 is further facilitated by way of a remote maintenance monitoring control system 50. As herein disclosed, the purpose of the remote maintenance monitoring control system 50 is to provide for historical event data analysis and assumption of monitored system CPU 5 console command input capabilities. Detailed and enabling disclosure of such analysis and console command technology is referenced herewith by U.S. Pat. No. 5,689,637, entitled "Console Simulator, Multi-Console Management System and Console Management Distribution System", issued to Applicant, Nov. 18, 1997, and Applicant's application Ser. No. 08/942,993, filed Oct. 2, 1997 and entitled "Emulation and Emulated Screen History". Both U.S. Pat. No. 5,689,637 and Applicant's application Ser. No. 08/942,993 are hereby cited and incorporated within the instant application by reference for purposes of providing a full, detailed and enabling disclosure. The objects to be monitored 6 within the context of a monitored system CPU 5 represent a limitless scope of monitoring potential. Examples of monitored objects might include hardware component functionality, water temperature, fire/smoke detection, mold curing processes, critical operating systems, components and indeed, even user written application programs. The means by which such objects are defined to third party alert event monitoring systems will quite typically be represented as input control parameters (a.k.a. "parm. fields") passed to the alert event software. Use of "parm. fields" is a long standing information systems processing technique and as such, is a practice well known to those reasonably skilled in the art.

Continuing with FIG. 2, the Improved Alert Monitoring System provides for repository of relevant object information in the form of an IAMS database server 35 whereby entries 7 associated with each object to be monitored 6 are created, referenced and maintained. Examples of such information would be connect string control parameters to allow connectivity of the Improved Alert Monitoring System 4 to a monitored system CPU 5 as a command console. Additional information created, referenced and maintained within the IAMS database server 35 would include corrective actions to be initiated during the occasion of an alert object event, scripts to be executed or indeed, any other information deemed relevant in the remedying of an object alert, or an object alert's precipitating factors. A representative icon 8 of each object monitored is presented to the Improved Alert Monitoring System video display capability 40 as a color coded icon 8 representing the dynamically modifiable status of each object to be monitored. Though the embodiment of the invention as illustrated in FIG. 2 allows for remote system connectivity to a monitored system as a command console, the Improved Alert Monitoring System also allows for a non-console oriented response, should such response be indicated via retrieval of IAMS object information 7 from the IAMS database server 35. Non-limiting examples of such nonconsole specific responses would be triggering of an external event such as the paging of a specific telephone number or the triggering of an alarm, or indeed any other event not requiring connectivity as a command console entry. As can be appreciated, the Improved Alert Monitoring System provides for multiple processing alternatives. Those alternatives are defined and disclosed as a logic flow summary in FIG. 3.

Figure 3:
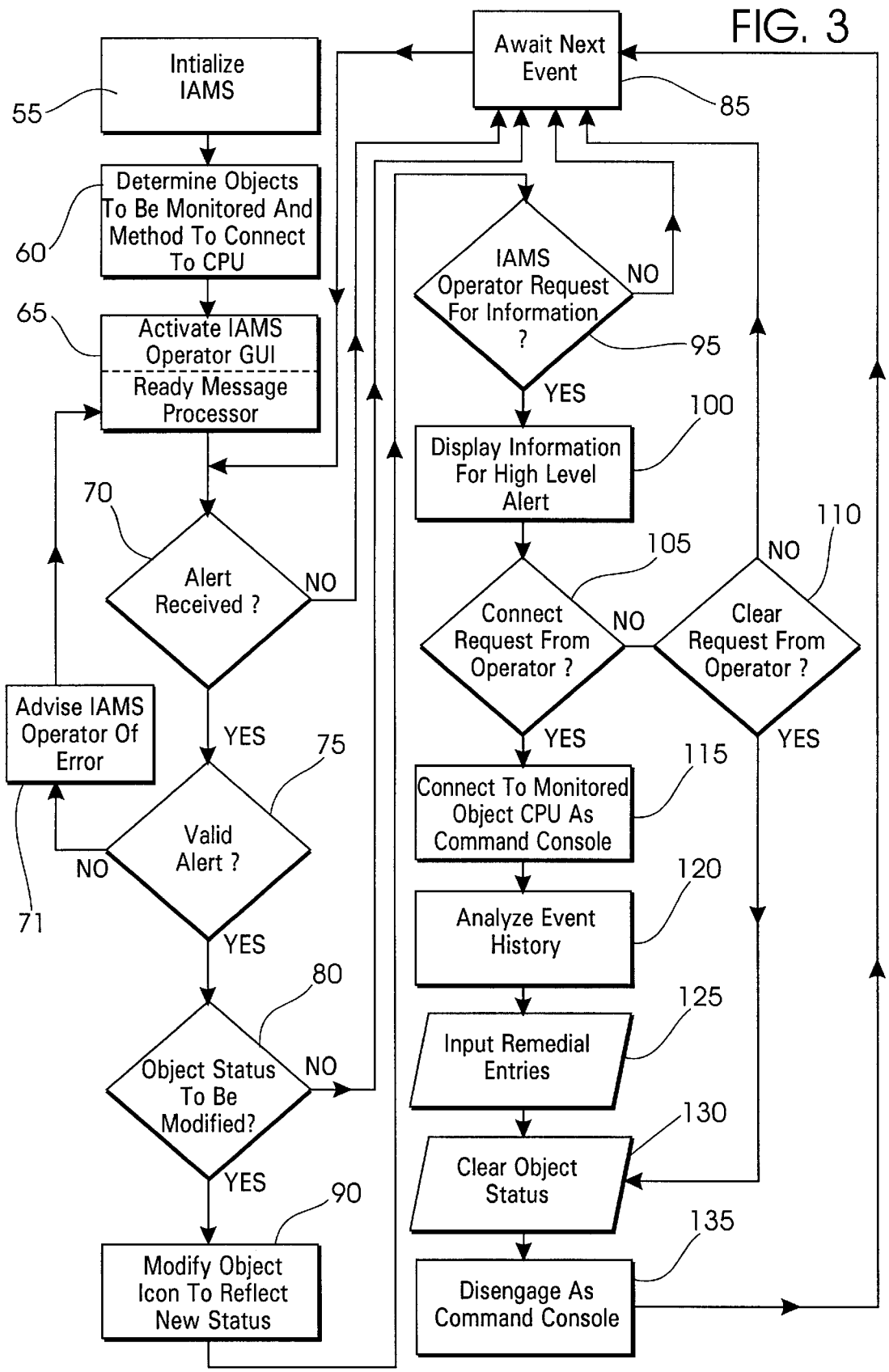
FIG. 3 is a logic flow depiction of the methodology employed by the inventions preferred embodiment.

Turning now to FIG. 3, the first step with regard to execution of the Improved Alert Monitoring System is the initializing of the system as shown at box 55. The initialization of the system calls for IAMS to be retrieved from auxiliary storage and read into the read access memory or RAM, of the monitoring system CPU 2. Once resident in the monitoring system CPU 2, the Improved Alert Monitoring System determines those objects to be monitored, the CPU's to which monitored objects are connected, and the methods to connect the IAMS video display capability 40 and console entry input capability 45 to a monitored system CPU 5 as a console with input capability. To determine the objects to be monitored and the methods to connect to a monitored system CPU 5, a query is made of the IAMS database server 35 wherefrom such information is retrieved as illustrated at box 60. Connect string parameters representative of information required to connect to a monitored system CPU as a command console input capability are retrieved, as well as any other information deemed necessary to support the IAMS functional requirements. The Improved Alert Monitoring System next initializes its operator graphic user interface and activates its message processing component as shown at box 65.

At this point, the system is in a ready state and awaits communication from a monitored system CPU 5 indicating an alert object event has taken place 70. Having once received an alert notification, the system next determines if the received alert is valid 75. If found invalid, the system advises the Improved Alert Monitoring System operator that an error has occurred 71 and returns to await the next alert notification 70 from the monitored system CPU 5. Finding the alert information passed to it from the monitored system CPU valid, the Improved Alert Monitoring System next determines if the representative icon 8 warrants an object status modification 80. Such modification typically entails the changing of an icon color to reflect a transition of one status state to another. By way of example, a normal operating state of a given representative icon might be displayed in the color green. Should a critical event occur, however, information maintained in the data base repository 35 relating to the icon would likely indicate the color of the icon should be changed from green to red due to the critical nature of the alert. The Improved Alert Monitoring System would modify the icon accordingly 90.

The system next determines if the operator has requested additional information as shown at box 95 relating to the alert event. Such a request is facilitated via IAMS graphic user interface and all information relevant to the highest level alert for a specific object 100 is returned to the operator and is displayed. If the operator has not requested additional information, the system awaits the next event as shown at box 85.

At this point, once the highest level alert has been displayed, the system determines if the operator has requested to connect to the monitored system CPU with console input capability 105. If the next request is not a connect command request, the system determines if the request received is a clear alert request 110. If neither of the preceding requests are received from the operator, the system returns to await the next alert object event issued by a monitored system CPU 5. If, however, a connect command has been received, the system retrieves the connect control string parameters previously retrieved from the IAMS data base server 35, passes that information to the remote maintenance monitoring control system 50 executing within the monitoring system CPU 5, and connects the Improved Alert Monitoring System client as a console with command input capability to the monitored system 5. This step is shown at box 115.

At this point, an optional request can be made to retrieve all relevant history information associated with the alert object event 120. Such information may be made available to the Improved Alert Monitoring System operator by way of technology as manifested and disclosed in Applicant's application Ser. No. 08/942,993, filed Oct. 2, 1997, entitled "Emulation and Emulated Screen History". It will be recognized that this is an optional and not required feature of the instant invention.

Having once analyzed precipitating events relevant to the alert, the operator by way of command console authority inputs remedial entries resolving the underlying alert problem 125. The operator then clears the alert indicator causing a representative change in icon color (typically red to green), and clears the object status 130. Lastly the system disengages as a command console 135 and returns to await the next event to be sent from a monitored system CPU 5.

Figure 4:
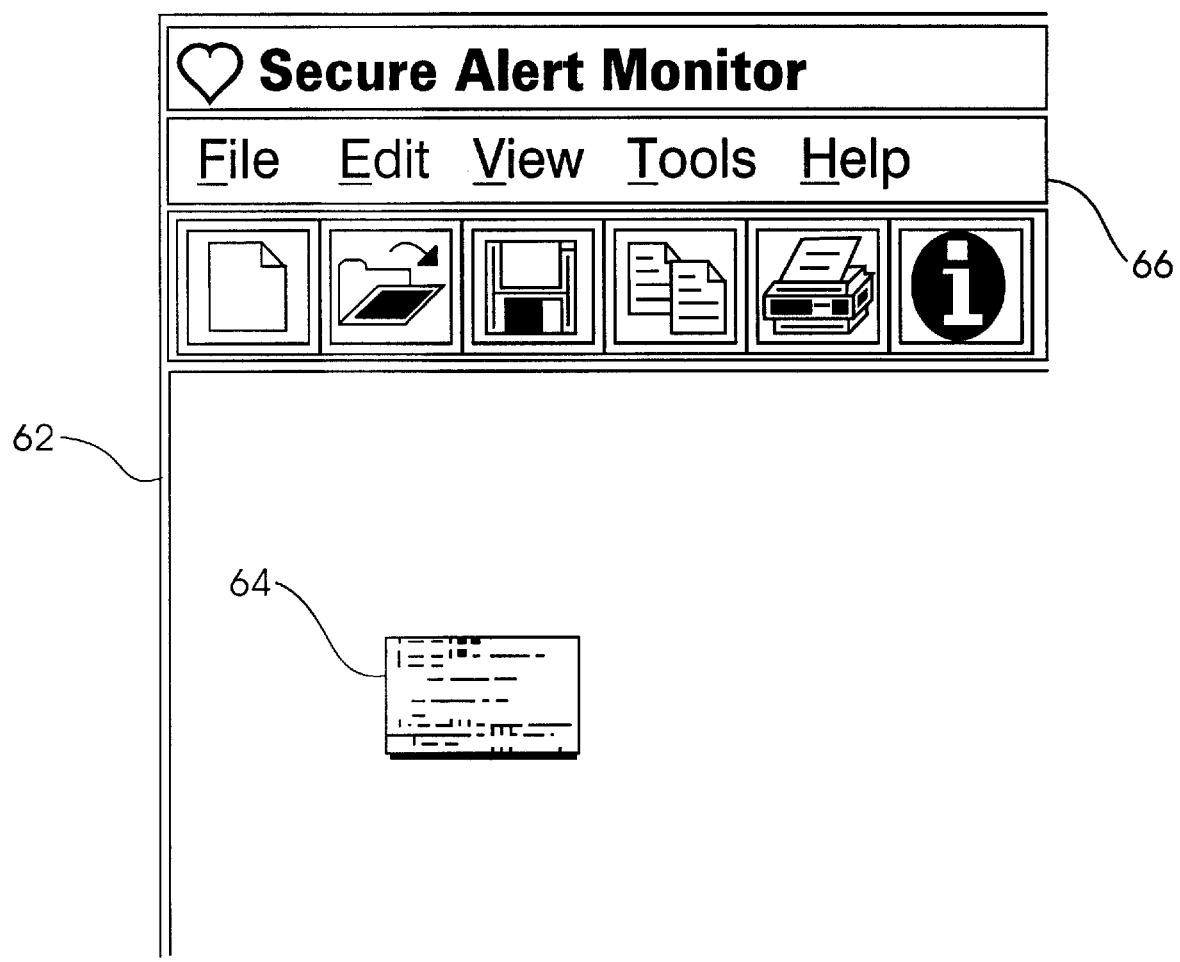

Turning now to FIG. 4, an initialized IAMS startup screen 62 is illustrated where 64 represents an icon indicative of one or more objects to be monitored from within a monitored system CPU 5. A tool bar capability 66 is provided to facilitate operator interaction.

Figure 5:
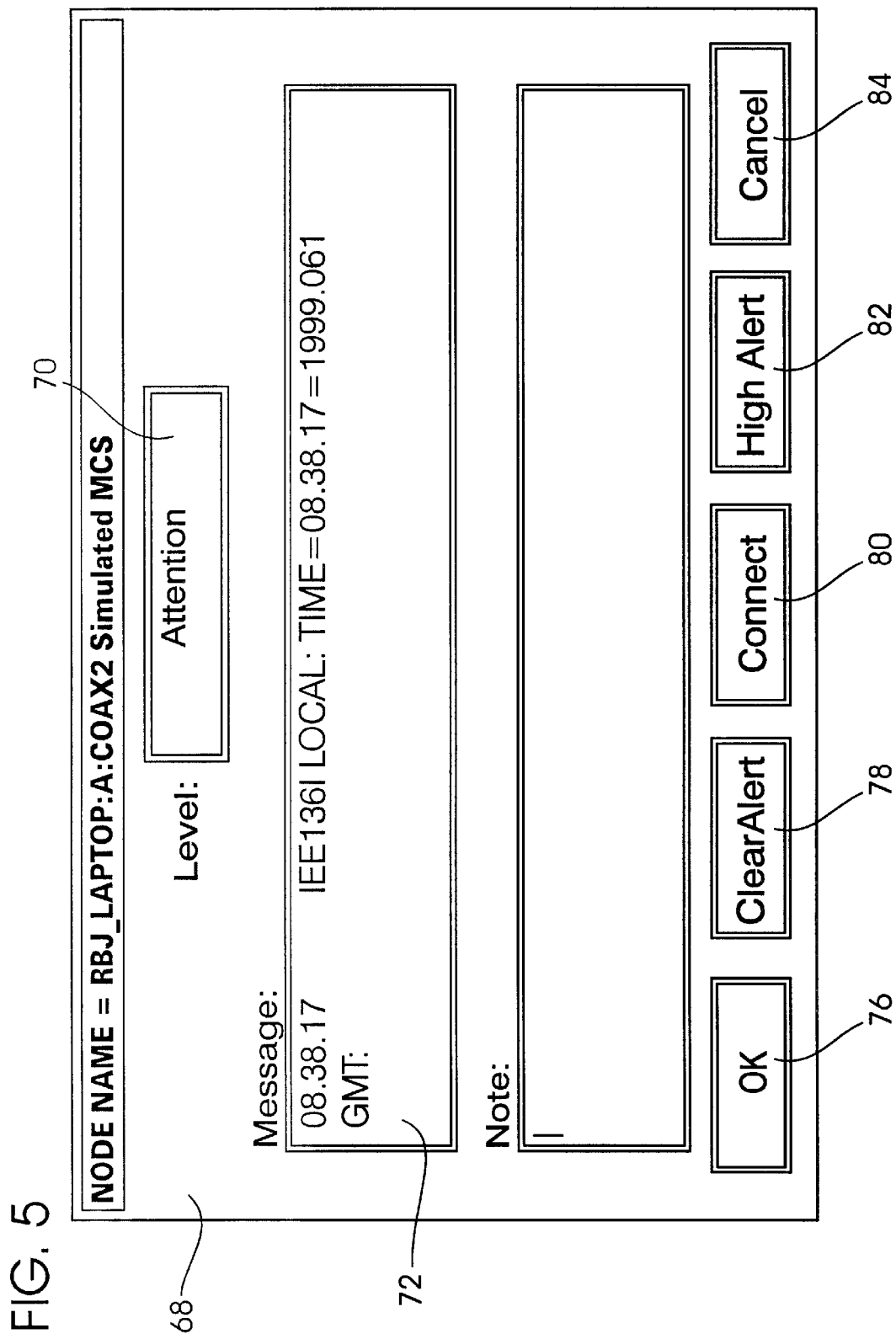

Turning now to FIG. 5. FIG. 5 illustrates an example of a GUI 68 presented by the Improved Alert Monitoring System is illustrated when a request for additional information has been made (shown as 95 in FIG. 3) following an alert object event. In this illustration, an "attention" level alert is designated 70 and information related to the highest level alert for a specific icon would be presented in the space provided within the GUI 72. Functionality options such as clearing an alert 78, connecting to a monitored system CPU as a command console entry 80, requesting high alert information 82, canceling the alert 84 and the transmitting of such information to the Improved Alert Monitoring System by way of depressing the OK key 76 is communicated by engaging the relevant option button.

Figure 6:
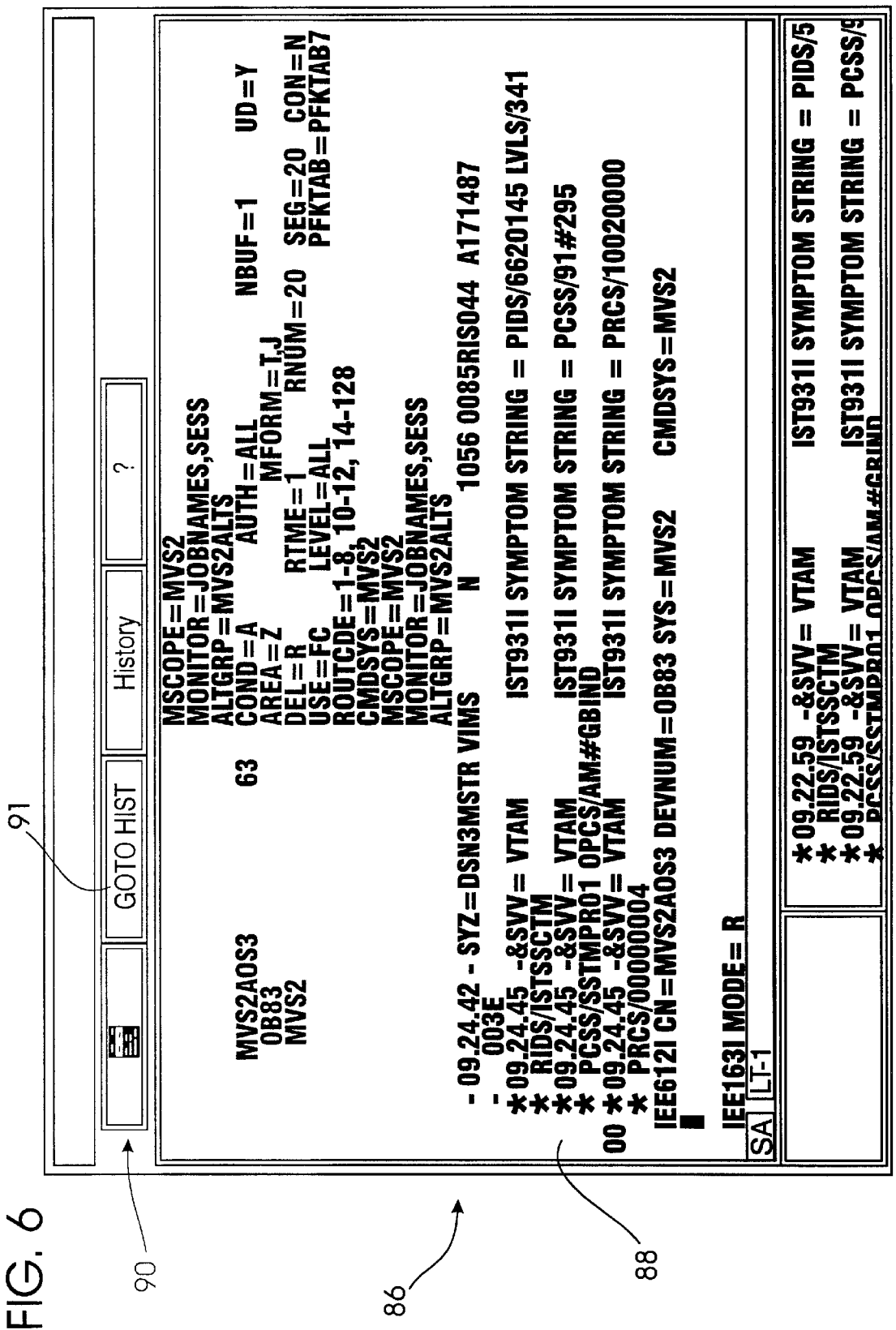

FIG. 6 represents a GUI, illustrating an emulated screen display having once connected to a monitored systems CPU as a command console input capability (shown at box 115 in FIG. 3). Actual monitored system messages are scrolled upon the console screen 88, while the tool bar 90 provides for retrieval of relevant history information 91 to allow an analysis of precipitating factors event factors.

Turning now to FIG. 7, a GUI is illustrated which provides a history of precipitating factors and allows for scrolling of such information via the GUI's tool bar 94 causing the object alert event.

The GUI also provides for a return to an active console display and input capability status by depressing the "GOTOLIVE" button 96.

Figure 8:
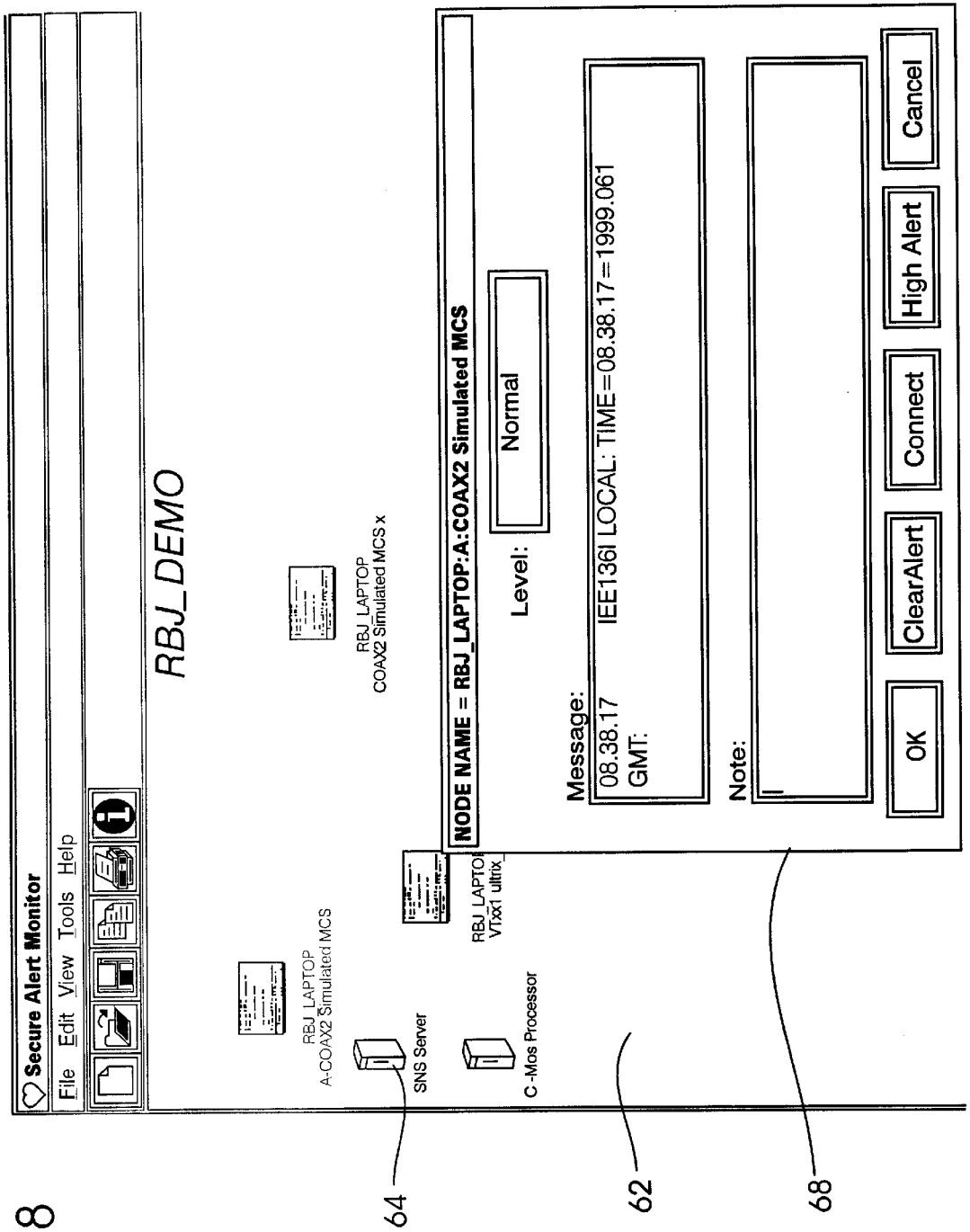

Turning now to FIG. 8, a GUI 62 is illustrated showing objects being monitored 64 with an overlapping request for additional information screen 68.

While this invention has been described in reference to illustrative embodiments, this description is not to be construed in a limiting sense. Various modifications and combinations of the illustrative embodiments as well as other embodiments of the invention will be apparent to those skilled in the art upon referencing this disclosure. It is therefore intended that this disclosure encompass any such modifications or embodiments.

What is claimed is:

1. An computerized alert monitoring system for use with at least one transmitting system central processing unit remote from said monitoring system, said transmitting system having a console configured to communicate computer generated alert information, said system comprising:

at least one monitoring system central processing unit communicably attached to said transmitting system central processing unit;

a video display in communication with and located at said monitoring system central processing unit and said transmitting system central processing unit;

a console entry input capability in communication with ad located at said monitoring system central processing unit and in communication with said transmitting system central processing unit; and a computer program executing within said monitoring system to receive said computer generated alert information and, upon operator action, to connect to said transmitting system and emulate console display screens of said transmitting console as well as updates thereto, said operator using said computer program to retrieve history of message activity of said display screens from said transmitting system to permit said operator to interactively analyze said transmitting system display screens, to analyze dynamic event history, and to input remedial entries.

2. The computerized alert monitoring system as recited in claim 1 wherein said monitoring system central processing unit and said transmitting system central processing unit are communicably attached by a computer network.

3. The computer program as recited in claim 1, wherein said communication with said central processing unit further comprises connecting to said central processing unit as an operator command console.

4. A computerized alert monitoring system as set forth in claim 1 wherein said computer generated alert information includes a sen icon and said operator action includes clicking on said screen icon to connect to, emulate and display screens of said transmitting console.

5. A computerized alert monitoring system as set forth in claim 1 including a memory in said transmitting system to store both said history of a plurality of said console screen displays and said plurality of system information updates to said transmitting screen displays.

6. A computerize alert monitoring system as set forth in claim 5 wherein said transmitting screen displays and said plurality of system information updates may be accessed and transmitted in reverse order.

7. A computerized alert monitoring system as set forth in claim 5 wherein said plurality of screen displays and said plurality of system information updates may be browsed.

8. A method to communicate computerized alert information between transmitting and monitoring system central processing units, comprising the steps of:

initializing an alert monitor program within a monitoring system central processing unit;

determining at least one transmitting system to be monitored by said alert monitor program;

displaying at least one representative alert upon said alert monitor video display;

awaiting a monitored alert event from said transmitting system central processing unit;

validating said alert event received from said transition system central processing unit;

modifying said representative alert;

emulating console display screens of said transmitting system using history of said displace screens from said transmitting system as well as updates;

inputting remedial entries at said monitoring system to said transmitting system central processing unit by an operator after interactively analyzing said history of said emulated display screens; and modifying said representative alert to denote resolved alert event status.

9. A method to communicate computerized alert information as set forth in claim 8 including the steps of:

storing both a history of a plurality of said transmitting screen displays and a plurality of updates to said screen displays in said transmitting system.

10. A method to communicate computerized alert information as set forth in claim 9 including transmitting said transmitting screen displays and plurality of updates in reverse order.

* * * * *

UNITED STATES PATENT AND TRADEMARK OFFICE
CERTIFICATE OF CORRECTION

PATENT NO. : 6,275,855 B1
DATED : August 14, 2001
INVENTOR(S) : R. Brent Johnson It is certified that error appears in the above-identified patent and that said Letters Patent is hereby corrected as shown below:

Column 7,
Line 23, the word "An" should be -- A --;
Line 34, the word "ad" should be -- and --;

Column 8,
Line 5, the word "sen" should be -- screen --;
Line 13, the word "computerize" should be -- computerized --;
Line 32, the word "transition" should be -- transmitting --;
Line 36, the word "displace" should read -- display --;

Signed and Sealed this

Sixth Day of August, 2002

Attest:

JAMES E. ROGAN
Attesting Officer     Director of the United States Patent and Trademark Office